J. W. ANDERSON.
TIRE PUNCTURE DETECTOR.
APPLICATION FILED AUG. 20, 1913.

1,111,985.

Patented Sept. 29, 1914.

WITNESSES:
Charles Pickles
R. S. Burry

INVENTOR
James W. Anderson
BY G. H. Strong
ATTORNEY

UNITED STATES PATENT OFFICE.

JAMES W. ANDERSON, OF SAN FRANCISCO, CALIFORNIA.

TIRE-PUNCTURE DETECTOR.

1,111,985.  Specification of Letters Patent.  Patented Sept. 29, 1914.

Application filed August 20, 1913. Serial No. 785,815.

*To all whom it may concern:*

Be it known that I, JAMES W. ANDERSON, a citizen of the United States, residing in the city and county of San Francisco and State of California, have invented new and useful Improvements in Tire-Puncture Detectors, of which the following is a specification.

This invention relates to a puncture detector for automobile and like pneumatic tires.

The object of the invention is to provide a simple, cheap, practical and sensitive means for detecting small, but nevertheless troublesome leaks in pneumatic tires, which will occupy but very little room and which will cover considerable surface of the tire, and at the same time will indicate the immediate locality where the leak is when the device is moved along the tire and over the leak.

The invention consists of the parts, and the construction and combination of parts as hereinafter more fully described and claimed, having reference to the accompanying drawings, in which—

Figure 1:
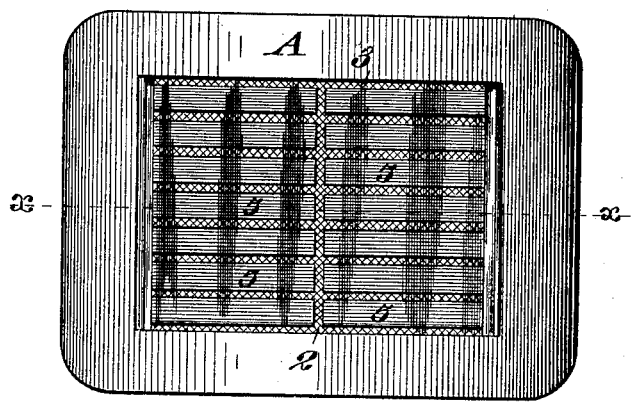
Figure 2:
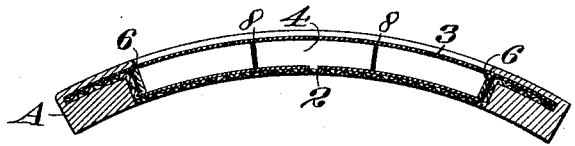
Figure 3:
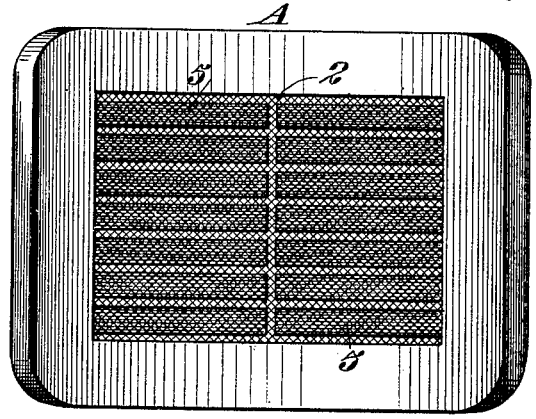

Figure 1 is a front elevation of the device. Fig. 2 is a section on line X—X, Fig. 1. Fig. 3 is a rear elevation of the device.

A is a frame of suitable size, shape and material, preferably curved to fit the contour of the tire. Its dimensions are such as preferably to extend over the tread portion of the tire and when pressed down thereon to maintain a substantially tight joint therewith. Preferably the frame is built up from sections of heavy sole leather or fiber board, for the purpose of lightness and strength. The open portion of the underside of the frame is covered with wire netting 2 and the open space in the frame is covered at the top by a sheet of celluloid 3, or other transparent window material; the space between the window 3 and the reticulated bottom 2 provides a chamber 4, Fig. 2, or a series of chambers 4', Fig. 4, to contain the sensitive leak-detecting medium 5. In Fig. 1 this leak-detecting medium 5 comprises one or more series of tissue paper strips secured at one end to the frame, as shown at 6. Preferably there are two opposing sets of paper strips 5 extending from opposite sides of the frame toward the center; the free end of the strips being at the center so that when a jet of air is directed from below through the screen 2 it will act on the strips to lift them successively or in unison; the arrangement and action being somewhat akin to the arrangement and action of the keys of a piano keyboard.

Having thus described my invention what I claim and desire to secure by Letters Patent is—

1. A puncture detector for pneumatic tires consisting of a frame fitting the periphery of the tire and said frame having a bottom pervious to air, and a transparent top, said top and pervious bottom inclosing a chamber, and a series of flexible strips hingedly mounted in said chamber, and operable by a current of air passing through the pervious bottom.

2. In a puncture detector the combination of a frame having a reticulated bottom and a flexible strip hingedly supported at one end and resting on said bottom.

In testimony whereof I have hereunto set my hand in the presence of two subscribing witnesses.

JAMES W. ANDERSON.

Witnesses:
JOHN H. HERRING,
W. W. HEALEY.

Copies of this patent may be obtained for five cents each, by addressing the "Commissioner of Patents, Washington, D. C."